US011258755B2

(12) United States Patent
Frakes et al.

(10) Patent No.: US 11,258,755 B2
(45) Date of Patent: Feb. 22, 2022

(54) METHOD AND SYSTEM FOR PROCESSING COHERENT DATA

(71) Applicant: GM GLOBAL TECHNOLOGY OPERATIONS LLC, Detroit, MI (US)

(72) Inventors: Morgan Glen Frakes, Madison Heights, MI (US); Joshua J. McDonough, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 16/575,782

(22) Filed: Sep. 19, 2019

(65) Prior Publication Data
US 2021/0092033 A1 Mar. 25, 2021

(51) Int. Cl.
| | |
|---|---|
| H04L 12/40 | (2006.01) |
| B60R 16/023 | (2006.01) |
| H04L 29/12 | (2006.01) |
| H04L 12/26 | (2006.01) |
| H04L 101/627 | (2022.01) |
| H04L 43/0829 | (2022.01) |
| H04L 43/0852 | (2022.01) |
| H04L 43/04 | (2022.01) |

(52) U.S. Cl.
CPC ........ *H04L 61/6027* (2013.01); *B60R 16/023* (2013.01); *H04L 12/40* (2013.01); *H04L 43/04* (2013.01); *H04L 43/0829* (2013.01); *H04L 43/0852* (2013.01); *H04L 2012/40215* (2013.01); *H04L 2012/40273* (2013.01)

(58) Field of Classification Search
CPC . H04L 2012/40215; H04L 2012/40273; H04L 61/6027; H04L 12/40; H04L 43/04; B60R 16/023
See application file for complete search history.

(56) References Cited

U.S. PATENT DOCUMENTS

| | | | |
|---|---|---|---|
| 2008/0186870 A1* | 8/2008 | Butts | H04L 43/0847 370/252 |
| 2010/0150176 A1* | 6/2010 | Yakashiro | H04L 12/40163 370/475 |
| 2015/0063371 A1* | 3/2015 | Horvath | H04L 47/805 370/461 |

(Continued)

*Primary Examiner* — David R Lazaro
*Assistant Examiner* — Xiang Yu
(74) *Attorney, Agent, or Firm* — Lorenz and Kopf LLP

(57) ABSTRACT

Methods, systems and computer readable storage medium for processing coherent data are provided. In an embodiment, a method for processing coherent data includes dividing the coherent data into two separate frames. Further, the method includes applying a same coherency number to the two separate frames and transmitting a signal including the two separate frames to a receiving module. The method also includes determining whether the two separate frames match based on the same coherency number. When the two separate frames match, the method outputs the two separate frames to downstream logic. The method may include adding the two separate frames to a buffer populated with a selected number of most recently received frames and, when the two separate frames do not match, identifying a selected frame from the two separate frames and searching the buffer for a matching frame from the most recently received frames.

17 Claims, 2 Drawing Sheets

(56) References Cited

U.S. PATENT DOCUMENTS

| | | | |
|---|---|---|---|
| 2016/0099926 A1* | 4/2016 | Lee | H04L 67/12 |
| | | | 726/7 |
| 2016/0264071 A1* | 9/2016 | Ujiie | H04L 63/123 |
| 2020/0076643 A1* | 3/2020 | Wojciechowski | H04L 7/0079 |
| 2020/0092129 A1* | 3/2020 | Lin | H04L 9/0819 |

* cited by examiner

METHOD AND SYSTEM FOR PROCESSING COHERENT DATA

INTRODUCTION

A Controller Area Network (CAN) bus is a robust vehicle bus standard designed to allow microcontrollers and devices to communicate with each other in applications without a host computer. It is a message-based protocol, designed originally for multiplex electrical wiring within automobiles to save on copper, but can also be used in many other contexts.

The modern automobile may have as many as seventy electronic control units (ECU) for various subsystems. Typically the biggest processor is the engine control unit. Others are used for transmission, airbags, antilock braking/ABS, cruise control, electric power steering, audio systems, power windows, doors, mirror adjustment, battery and recharging systems for hybrid/electric cars, etc. Some of these form independent subsystems, but communications among others are essential. A controller or subsystem may need to control actuators or receive feedback from sensors. The Controller Area Network (CAN) standard was devised to facilitate communication of controller-to-controller information, i.e., sensor information read by one controller may be shared with other controllers. One key advantage is that interconnection between different vehicle systems can allow a wide range of safety, economy and convenience features to be implemented using software alone—functionality which would add cost and complexity if such features were "hard wired" using traditional automotive electrics.

In a Controller Area Network (CAN) bus, data is communicated via frames. The frames have a maximum data capacity. Coherent data, i.e., data that is obtained at a same time and should be processed in unison, may exceed the maximum data capacity of a CAN frame.

Accordingly, it is desirable to provide methods, systems and computer readable storage medium for processing coherent data that exceeds the data capacity of CAN frames. Further, it is desirable to provide such methods, systems and computer readable storage medium that overcome delays or errors in data transmission through a CAN bus. Furthermore, other desirable features and characteristics will become apparent from the subsequent detailed description and the appended claims, taken in conjunction with the accompanying drawings and the introduction.

SUMMARY

Methods, systems and computer readable storage medium for processing coherent data are provided. In an embodiment, a method for processing coherent data includes dividing the coherent data into two separate frames. Further, the method includes applying a same coherency number to the two separate frames and transmitting a signal including the two separate frames to a receiving module. The method also includes determining whether the two separate frames match based on the same coherency number. When the two separate frames match, the method outputs the two separate frames to downstream logic.

In the method, applying the same coherency number to the two separate frames may include selecting the same coherency number from a bit-limited rolling counter value. Further, applying the same coherency number to the two separate frames may occur simultaneously with transmitting the signal including the two separate frames to the receiving module. In certain embodiments, the same coherency number is selected based on the time that the signal is transmitted. In other embodiments, the method includes obtaining the coherent data with the transmitting module, such as by reading or sampling sensor or input data, and the same coherency number is selected based on the time that the coherent data is obtained, i.e., the time when the sensor or input data was sampled or read.

In certain embodiments, the method further includes reading or sampling vehicle sensor data from a vehicle sensor with a transmitting module within a vehicle, wherein the vehicle sensor data is the coherent data; transmitting the coherent data to a receiving module within that same vehicle; processing the coherent data from the two separate frames for use in the downstream logic; and operating the vehicle based on that downstream logic; wherein the transmitting module divides the coherent data into the two separate frames, applies the same coherency number to the two separate frames, and transmits the signal including the two separate frames to the receiving module; and wherein the receiving module determines whether the two separate frames match based on the same coherency number and outputs the two separate frames to the downstream logic when the two separate frames match.

The method may further include adding the two separate frames to a buffer populated with a selected number of most recently received frames and, when the two separate frames do not match, identifying a selected frame from the two separate frames and searching the buffer for a matching frame from the most recently received frames, such as by selecting the matching frame based on the coherency number. In such embodiments, the method may further include identifying the matching frame from the most recently received frames and outputting the selected frame and the matching frame to the downstream logic. In certain embodiments, the method may further include confirming that the most recently received frames do not include a matching frame and setting a coherency error indication. Also or alternatively, such methods may further include analyzing the most recently received frames to identify an expected coherency number or range of coherency numbers. In certain embodiments, the coherency number of each of the two separate frames is compared to the expected coherency number or range of coherency numbers.

In another embodiment, a system is provided for processing coherent data. The system includes a communications network coupled by a communication bus, a transmitting module configured to transmit a signal including coherent data divided between two separate controller area network (CAN) frames and to apply a same coherency number to the two separate CAN frames, a receiving module including a buffer for storing a selected number of most recently received frames, and an alignment module for matching frames based on the coherency number of each frame. In certain embodiments, the system further includes downstream logic configured to receive matched frames from the alignment module.

In the system, the transmitting module may be configured to select the same coherency number from a bit-limited rolling counter value. Further, the transmitting module may be configured to apply the same coherency number to the two separate CAN frames simultaneously with transmitting the signal to the receiving module. Also, the transmitting module may be configured to select the same coherency number based on the time that the signal is transmitted. Alternatively, the transmitting module may be configured to select the same coherency number based on the time that the coherent data is obtained, i.e., the time when a sensor or input data was sampled or read.

In certain embodiments, the alignment module may be configured to search the buffer for a matching frame from the most recently received frames. Further, the alignment module may be configured to set a coherency error indication when the most recently received frames do not include a matching frame.

Also, in the system, the alignment module may be configured to analyze the most recently received frames to identify an expected coherency number or range of coherency numbers and to compare the coherency number of each of the two separate frames to the expected coherency number or range of coherency numbers.

Another embodiment includes a non-transitory computer readable storage medium having program instructions embodied therewith, the program instructions readable by a processor to cause the processor to perform a method for processing coherent data including dividing the coherent data into two separate frames, applying a same coherency number to the two separate frames, transmitting a signal including the two separate frames to a receiving module, determining whether the two separate frames match based on the same coherency number, and when the two separate frames match, outputting the two separate frames to downstream logic. In certain embodiments, the same coherency number is selected from a bit-limited rolling counter value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present subject matter will hereinafter be described in conjunction with the following drawing figures, wherein like numerals denote like elements, and wherein.

DETAILED DESCRIPTION

Figure 1:
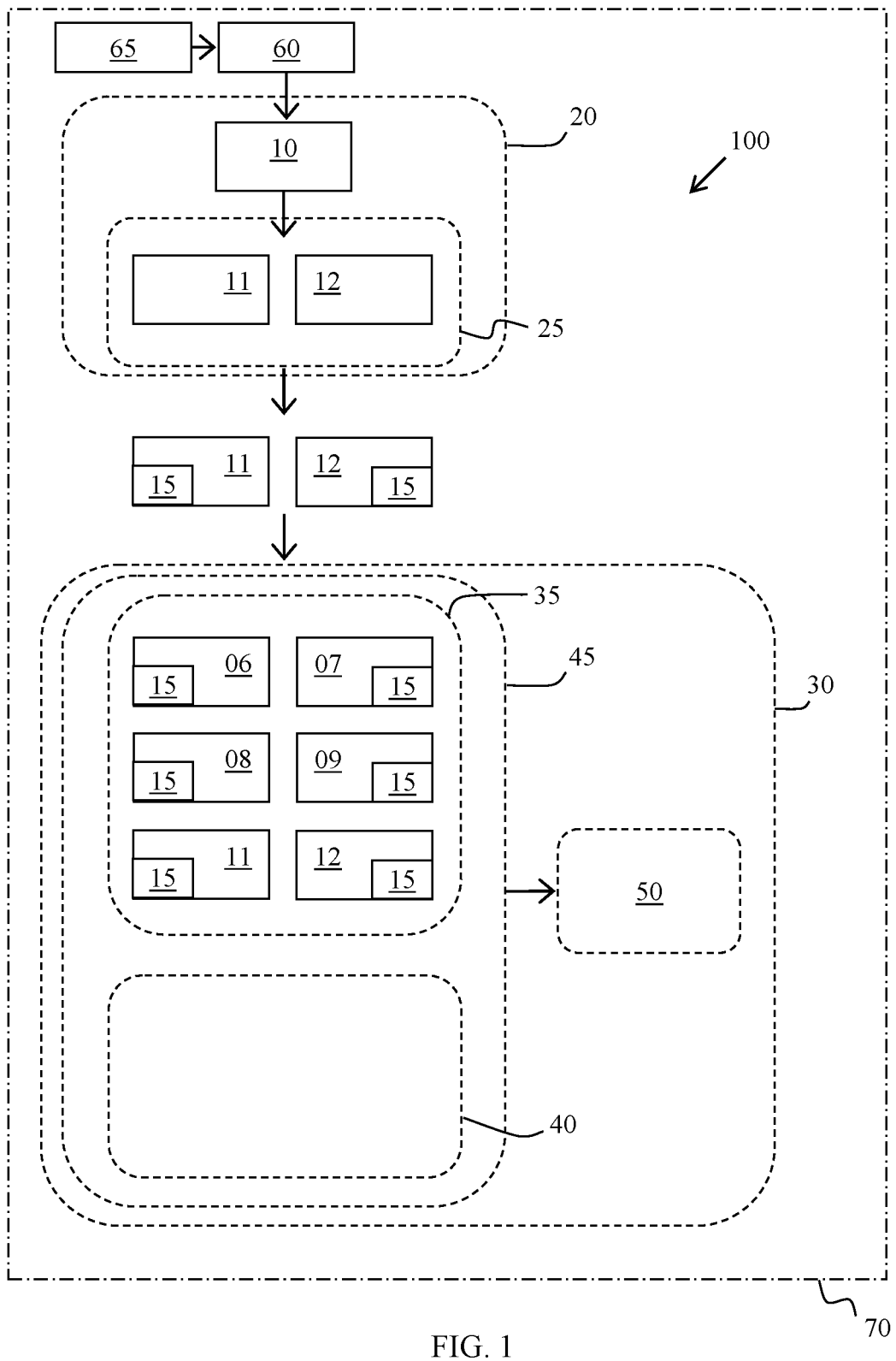
FIG. 1 is a schematic representation of a system for processing coherent data in accordance with embodiments herein.

The following detailed description is merely illustrative in nature and is not intended to limit the embodiments of methods, systems and computer readable storage medium for processing coherent data described herein. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments herein may be described below with reference to schematic or flowchart illustrations of methods, systems, devices, or apparatus that may employ programming and computer program products. It will be understood that blocks, and combinations of blocks, of the schematic or flowchart illustrations, can be implemented by programming instructions, including computer program instructions. These computer program instructions may be loaded onto a computer or other programmable data processing apparatus (such as a controller, microcontroller, or processor) to produce a machine, such that the instructions which execute on the computer or other programmable data processing apparatus create instructions for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Programming instructions may also be stored in and/or implemented via electronic circuitry, including integrated circuits (ICs) and Application Specific Integrated Circuits (ASICs) used in conjunction with sensor devices, apparatuses, and systems.

As described herein, methods, systems and computer readable storage medium are provided for processing data in a controller area network (CAN). More particularly, the coherent data processing scheme described herein provides for processing amounts of data greater than the limit of a single CAN frame. Specifically, embodiments herein provide for splitting coherent data into two or more separate CAN frames and for successfully transmitting and receiving such CAN frames while eliminating or reducing mismatches of coherent data due to frame delay. As a result, the systems and methods described herein may ensure that the coherent data processed by downstream logic is the same set as was sent out by the original control module.

When a set of transmitting data from a device exceeds the capacity for a single CAN frame, the data is transmitted over multiple, separate frames in close proximity to each other. Between the variation in CAN transmit times and the execution rate of the receiving device's logic, these separated frames may not be processed as the same set or pair intended by the transmitter. When the data in two frames is coherent, it becomes necessary to ensure that each frame received is paired correctly for utilization by the downstream logic.

Sending a time-stamp with each frame of data can quickly lead to an overflow of bits on a CAN frame. Therefore, embodiments described herein do not send time-stamps with the frames of data. Rather, embodiments described herein use a coherency number as a substitute for a time-stamp. In an exemplary embodiment, the coherency number is selected from a limited range of values that roll over each time the bit register fills. Thus, each coherency number is a bit-limited, roll-over number utilized to verify the point in time that a message was sent out from a transmitting module. In exemplary embodiments herein, a transmitting module simultaneously assigns coherency numbers to CAN frames and transmits CAN frames including the coherency numbers.

Further, in embodiments described herein, the receiving module that receives the CAN frames employs an alignment process. In certain embodiments, the exemplary receiving module includes a buffer for holding a designated, limited number of most recent received messages (frames). The buffer is a storage mechanism for storing a recent history of messages for the alignment process to pull information from. The alignment process makes use of the outputs from the buffer to evaluate the coherency numbers associated with unique frames to intelligently process them through the host controller as the transmitting controller intended.

The exemplary receiving module further applies an algorithm that uses the coherency numbers to align any mismatched data received from the transmitting module. The algorithm may utilize existing diagnostic data and can be utilized by downstream diagnostics. This allows the buffer and alignment algorithm to be easily integrated into an existing software ring.

Using upstream diagnostic information, the alignment process and buffer only utilize processing power when under ideal conditions. The alignment process sends its own diagnostic information downstream to prevent the processing of its data under misaligned conditions.

As a result, when CAN frames are not aligned at the receiving module, valid data pairs can be cascaded within the buffer to make accurate controls decisions. In instances when the buffer does not contain valid pairs of data, downstream diagnostics that rely on the data will be halted until valid data can be paired. Bad alignment will trigger a diagnostic trouble code and may alert the service technician to the specific fault that has occurred.

As further described herein, it is possible that coherent data on separate frames may be offset such that parallel processing of the coherent data is inhibited.

Thus, a system and method are provided with an algorithm that provides strictly coherent data when two or more frames containing such coherent data are received from a controller area network (CAN). In exemplary embodiments, a rolling counter value (such as 0 through 15), storage buffer, and set of algorithms are utilized to diagnose and re-align the data from the separate frames when an offset in the rolling counter value between the frames is encountered. This data is then provided in coherent form to the downstream application software.

While other systems may throw out data that is found to be incoherent, the embodiments described herein provide for matching data sets to create pairs or sets of frames holding coherent data. As a result, safety critical information that must be used in unison can be packaged into separate CAN frames. As a result, embodiments described herein satisfy cybersecurity protection requirements while maintaining the fidelity of the safety critical information.

FIG. 1 provides a schematic representation of a motor vehicle 70 including a system 100, such as a controller area network, for processing coherent data 10. As shown, coherent data 10 is initially received or produced by a transmitting module 20 and is divided into two separate, distinct controller area network (CAN) frames or data sets 11 and 12. While two frames are illustrated, it is understood that the coherent data 10 may be divided into a higher number of frames as needed. In certain embodiments, the transmitting module 20 samples or reads sensor or input data to obtain the coherent data 10.

In an exemplary embodiment, the transmitting module 20 obtains the coherent data 10 in the form of vehicle sensor data from a vehicle sensor 60. An exemplary vehicle sensor 60 monitors operating conditions or performance of or at a vehicle component 65. The vehicle 70 may include a variety of sensors 60 that are used to provide or acquire information from respective vehicle components 65. For example, sensor 60 may include a transmission shifter position sensor, a transmission output speed sensor, a wheel speed sensor, a crank position sensor, a cam position sensor, a brake pedal position sensor, an accelerator pedal position sensor, or other sensors as are commonly used in automobiles.

In FIG. 1, after the coherent data 10 is divided into CAN frames 11 and 12, the CAN frames 11 and 12 are transmitted from the transmitting module 20 and are simultaneously assigned a coherency number 15. In an exemplary embodiment, a CAN transceiver or CAN transmit logic 25 in the transmitting module 20 of the controller area network 100 assigns the coherency number 15 and transmits the CAN frames 11 and 12. The coherency number 15 is stored within each frame. The coherency number 15 is representative of a time stamp. For example, a coherency number of zero is assigned from time=zero to time=20 milliseconds, a coherency number of one is assigned from time=20 milliseconds to time=40 milliseconds, a coherency number of two is assigned from time=40 milliseconds to time=60 milliseconds, and so on, until the rolling counter resets, such as from fifteen back to zero. In certain embodiments, the coherency number is set based on the time when the sensor or input data was sampled or read by the transmitting module 20. In other embodiments, the coherency number is set based on the time when the frames are transmitted.

The CAN frames 11 and 12 are communicated in a communications network coupled by a communication bus as indicated by arrows in FIG. 1. As shown in FIG. 1, the CAN frames 11 and 12 are received by a receiving module 30 and are placed in a buffer 35 within a coherency and incoming data processing module 45. A selected number of most recently received CAN frames 06, 07, 08, and 09 are also stored in the buffer 35. In exemplary embodiments, frames 06, 08 and 11 contain the same set of information, dynamic to time. Likewise, frames 07, 09 and 12 contain the same set of information, dynamic to time.

In the buffer 35, the coherency numbers 15 of the CAN frames 11 and 12 are compared. Assuming no delay or error was encountered when assigning the coherency numbers, transmitting the CAN frames 11 and 12, and receiving the CAN frames 11 and 12, then the coherency numbers 15 of the CAN frames should be identical, i.e., match. When the coherency numbers 15 of the CAN frames match, then the data in the CAN frames 11 and 12 is sent to the downstream controller logic 50.

However, if the coherency numbers 15 of the CAN frames 11 and 12 do not match, then the receiving module 30 utilizes an alignment module 40 within the coherency and incoming data processing module 45 to search through the buffer 35. The following table provides examples of alignment processing when receiving pairs of CAN frames 11 and 12, i.e., Data Sets A and B, with coherency numbers 15, i.e., Coherency A and Coherency B, respectively.

TABLE 1

Normal Operation

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 2 | 3 | 4 |
| Frame 12/Data Set B | set 0 | set 1 | set 2 | set 3 | set 4 |
| External CAN fault indication (CAN (100) Faulted) | No | No | No | No | No |
| Coherency Error Indication /DTCs Paused | No | No | No | No | No |
| Set Coherency DTC | No | No | No | No | No |
| Output Data set to Invalid | No | No | No | No | No |
| Output Data Set A | set 0 | set 1 | set 2 | set 3 | set 4 |
| Output Data Set B | set 0 | set 1 | set 2 | set 3 | set 4 |

In Table 1, at time=0 ms, a first frame 11 or Data Set A is received as set 0 with a coherency number (Coherency A) of 0 and a second frame 12 or Data Set B is received as set 0 with a coherency number (Coherency B) of 0. Because the coherency numbers of the CAN frames are both 0, Data Sets A and B at time=0 ms may be output to the downstream controller logic. Likewise, at time=50 ms, a first frame 11 or Data Set A is received as set 1 with a coherency number (Coherency A) of 1 and a second frame 12 or Data Set B is received as set 1 with a coherency number (Coherency B) of 1. Because the coherency numbers of the CAN frames are both 1, Data Sets A and B at time=50 ms may be output to the downstream controller logic. As shown in Table 1, the Data Sets A and B for each time period match and may be output to the downstream controller logic as Output Data Sets A and B.

TABLE 2

Off by One

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 1 | 2 | 3 | 4 | 5 |
| Frame 12/Data Set B | set 1 | set 2 | set 3 | set 4 | set 5 |
| External CAN Fault Indication (CAN (100) Faulted) | No | No | No | No | No |
| Coherency Error Indication | No | No | No | No | No |
| Set DTC | No | No | No | No | No |
| Output Data set to Invalid | No | No | No | No | No |
| Output Data Set A | set 0 | set 1 | set 2 | set 3 | set 4 |
| Output Data Set B | set 0 | set 1 | set 2 | set 3 | set 4 |

In Table 2, at time=0 ms, a first frame 11 or Data Set A is received as set 0 with a coherency number (Coherency A) of 0 and a second frame 12 or Data Set B is received as set 1 with a coherency number (Coherency B) of 1. Because the coherency numbers of the CAN frames do not match, Data Sets A and B at time=0 ms are not output together to the downstream controller logic. The alignment module is then used to search the buffer for a match to either Data Set's coherency number. Assuming an earlier received Data Set B, such as a Data Set B at time=−50 ms (not shown in Table 2), has a coherency number of 0, then the Data Set A (set 0) from time=0 ms and Data Set B (set 0) from time=−50 ms are matched by the alignment module and are outputted together to the downstream controller logic as Output Data Sets A and B.

Similarly, Data Set A (set 1) from time=50 ms and Data Set B (set 1) from time=0 ms will be matched by the alignment module and outputted together to the downstream controller logic; Data Set A (set 2) from time=100 ms and Data Set B (set 2) from time=50 ms will be matched by the alignment module and outputted together to the downstream controller logic; Data Set A (set 3) from time=150 ms and Data Set B (set 3) from time=100 ms will be matched by the alignment module and outputted together to the downstream controller logic; and Data Set A (set 4) from time=200 ms and Data Set B (set 4) from time=150 ms will be matched by the alignment module and outputted together to the downstream controller logic. As may be seen, transmission of each Data Set B to the downstream controller logic is delayed by at least 50 ms to await arrival of the matching respective Data Set A.

TABLE 3

Off by Two

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 2 | 3 | 4 | 5 | 6 |
| Frame 12/Data Set B | set 2 | set 3 | set 4 | set 5 | set 6 |
| External CAN Fault Indication (CAN (100) Faulted) | No | No | No | No | No |
| Coherency Error Indication | No | No | No | No | No |
| Set DTC | No | No | No | No | No |
| Output Data set to Invalid | No | No | No | No | No |
| Output Data Set A | set 0 | set 1 | set 2 | set 3 | set 4 |
| Output Data Set B | set 0 | set 1 | set 2 | set 3 | set 4 |

In Table 3, at time=0 ms, a first frame 11 or Data Set A is received as set 0 with a coherency number (Coherency A) of 0 and a second frame 12 or Data Set B is received as set 2 with a coherency number (Coherency B) of 2. Because the coherency numbers of the CAN frames do not match, Data Sets A and B at time=0 ms are not output together to the downstream controller logic. The alignment module is then used to search the buffer for a match to either Data Set's coherency number. Assuming an earlier received Data Set B, such as a Data Set B at time=−100 ms (not shown in Table 3), has a coherency number of 0, then the Data Set A (set 0) from time=0 ms and Data Set B (set 0) from time=−100 ms are matched by the alignment module and are outputted together to the downstream controller logic as Output Data Sets A and B.

At time=50 ms, a first frame 11 or Data Set A is received as set 1 with a coherency number (Coherency A) of 1 and a second frame 12 or Data Set B is received as set 3 with a coherency number (Coherency B) of 3. Because the coherency numbers of the CAN frames do not match, Data Sets A and B at time=50 ms are not output together to the downstream controller logic. The alignment module is then used to search the buffer for a match to either Data Set's coherency number. Assuming an earlier received Data Set B, such as a Data Set B at time=−50 ms (not shown in Table 3), has a coherency number of 1, then the Data Set A (set 1) from time=50 ms and Data Set B (set 1) from time=−50 ms are matched by the alignment module and are outputted together to the downstream controller logic as Output Data Sets A and B.

Likewise, Data Set A (set 2) from time=100 ms and Data Set B (set 2) from time=0 ms will be matched by the alignment module and outputted together to the downstream controller logic; Data Set A (set 3) from time=150 ms and Data Set B (set 3) from time=50 ms will be matched by the alignment module and outputted together to the downstream controller logic; Data Set A (set 4) from time=200 ms and Data Set B (set 4) from time=100 ms will be matched by the alignment module and outputted together to the downstream controller logic. As may be seen, transmission of each Data Set B to the downstream controller logic is delayed by at least 100 ms to await arrival of the matching respective Data Set A.

TABLE 4

Off by Three

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 3 | 4 | 5 | 6 | 7 |
| Frame 12/Data Set B | set 3 | set 4 | set 5 | set 6 | set 7 |
| External CAN Fault Indication (CAN (100) Faulted) | No | No | No | No | No |
| Coherency Error Indication | Yes | Yes | Yes | Yes | Yes |
| Set DTC | No | No | Yes | Yes | Yes |
| Output Data set to Invalid | No | No | Yes | Yes | Yes |
| Output Data Set A | set 15 | set 15 | set 15 | set 15 | set 15 |
| Output Data Set B | set 15 | set 15 | set 15 | set 15 | set 15 |

Table 4 illustrates that a limit may be applied to the search for a match for a data set. Specifically, the system may be set up to only search for a match in the buffer within the last two most recently received frames. Thus, in Table 4, at time=0 ms, a first frame 11 or Data Set A is received as set 0 with a coherency number (Coherency A) of 0 and a second frame 12 or Data Set B is received as set 3 with a coherency number (Coherency B) of 3. Because the coherency numbers of the CAN frames do not match, Data Sets A and B at time=0 ms are not output together to the downstream controller logic. The alignment module is then used to search the buffer for a match to either Data Set's coherency number, but only within the last two most recently received frames, such as at t=−50 and t=−100. Assuming that no Data Set A from time=−50 and time=−100 is found with a coherency number of 3 and Data Set B from time=−50 and time=−100 is found with a coherency number of 0, then the alignment module generates a coherency error indication, i.e., indicates that a coherency fault is pending, and no new Data Set is output to the downstream controller logic. In such cases, the last valid Data Set or the equivalent, e.g., "set 15" in Table 4, may be output to the downstream controller logic.

After receiving Data Set A as set 1 and Data Set B as set 4 at time=50 ms, the alignment module searches the buffer for a match to either Data Set's coherency number, but only within the last two most recently received frames. Assuming that no Data Set A from time=0 and time=−50 is found with a coherency number of 4 and Data Set B from time=0 and time=−50 is found with a coherency number of 1, then the alignment module again generates a coherency error indication or otherwise indicates that a coherency fault is pending and no new Data Set is output to the downstream controller logic. Again, the last valid Data Set or the equivalent, e.g., "set 15" in Table 4, may be output to the downstream controller logic.

This procedure is repeated for time=100 and after no matches are found and a coherency error indication is generated for a third consecutive frame period, the alignment module may set a diagnostic trouble code (DTC). In certain embodiments, the alignment module is programmed to set the DTC after three consecutive frame periods are received without finding matches within the defined frames to search, though another limit may be selected.

When the DTC is set, output data is set to invalid so that the downstream controller logic does not use any Data Sets received, as the data therein is not confirmed to have been generated at the same time by the transmitting module. The downstream controller logic in the receiving module may continue to use the last verified coherent data pair received from the transmitting module, e.g., data set 15 in Table 4, for a defined period of time until, for safety or functionality reasons, the use of such data is prohibited.

TABLE 5

Single Frame Delay

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 2 | 2 | 4 |
| Frame 12/Data Set B | set 0 | set 1 | set 2 | set 2 | set 4 |
| External CAN Fault Indication (CAN (100) Faulted) | No | No | No | No | No |
| Coherency Error Indication | No | No | No | No | No |
| Set DTC | No | No | No | No | No |
| Output Data set to Invalid | No | No | No | No | No |
| Output Data Set A | set 0 | set 1 | set 2 | set 2 | set 4 |
| Output Data Set B | set 0 | set 1 | set 2 | set 2 | set 4 |

Table 5 illustrates treatment of a single repeated or delayed frame. The Data Sets received at time=0 ms, time=50 ms, time=100 ms, and time=200 ms are aligned in pairs and are processed as described above in relation to Table 1. However, at time=150 ms, first frame 11 or Data Set A is received as set 3 with a coherency number (Coherency A) of 3 while second frame 12 or Data Set B is received as set 2 with coherency number (Coherency B) of 2. There are no matches for coherency number 3 within the designated range, while Data Set A at time=100 ms is set 2 with a coherency number (Coherency A) of 2. Therefore, the alignment module pairs Data Set A from time=100 ms with Data Set B from time=150 ms and allows the output of these Data Sets to persist without change.

TABLE 6

Double Frame Delay

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 2 | 2 | 2 |
| Frame 12/Data Set B | set 0 | set 1 | set 2 | set 2 | set 2 |
| External CAN Fault Indication (CAN (100) Faulted) | No | No | No | No | No |
| Coherency Error Indication | No | No | No | No | No |
| Set DTC | No | No | No | No | No |
| Output Data set to Invalid | No | No | No | No | No |
| Output Data Set A | set 0 | set 1 | set 2 | set 2 | set 2 |
| Output Data Set B | set 0 | set 1 | set 2 | set 2 | set 2 |

Table 6 illustrates treatment of a double repeated or delayed frame. The Data Sets received at time=0 ms, time=50 ms, and time=100 ms are aligned in pairs and are processed as described above in relation to Table 1. However, at time=150 ms, first frame 11 or Data Set A is received as set 3 with a coherency number (Coherency A) of 3 while second frame 12 or Data Set B is received as set 2 with coherency number (Coherency B) of 2. There are no matches for coherency number 3 within the designated range, while Data Set A at time=100 ms is set 2 with a coherency number (Coherency A) of 2. Therefore, the alignment module pairs Data Set A from time=100 ms with Data Set B from time=150 ms and allows the output of these paired Data Sets to persist without change.

Further, at time=200 ms, first frame 11 or Data Set A is received as set 4 with a coherency number (Coherency A) of 4 while second frame 12 or Data Set B is received as set 2 with coherency number (Coherency B) of 2. There are no matches for coherency number 4 within the designated range, while Data Set A at time=100 ms is set 2 with a coherency number (Coherency A) of 2. Therefore, the alignment module pairs Data Set A from time=100 ms with Data Set B from time=200 ms and continues to allow the output of these paired Data Sets to persist.

TABLE 7

Triple Frame Delay

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 1 | 1 | 1 |
| Frame 12/Data Set B | set 0 | set 1 | set 1 | set 1 | set 1 |
| External CAN Fault Indication (CAN (100) Faulted) | No | No | No | No | No |
| Coherency Error Indication | No | No | No | No | Yes |
| Set DTC | No | No | No | No | No |
| Output Data set to Invalid | No | No | No | No | No |
| Output Data Set A | set 0 | set 1 | set 1 | set 1 | set 1 |
| Output Data Set B | set 0 | set 1 | set 1 | set 1 | set 1 |

Table 7 illustrates treatment of a triple repeated or delayed frame. The Data Sets received at time=0 ms and time=50 ms are aligned in pairs and are processed as described above in relation to Table 1. However, at time=100 ms, first frame 11 or Data Set A is received as set 2 with a coherency number (Coherency A) of 2, at time=150 ms, first frame 11 or Data Set A is received as set 3 with a coherency number (Coherency A) of 3, and at time=200 ms, first frame 11 or Data Set A is received as set 4 with a coherency number (Coherency A) of 4, while at time=100 ms, 150 ms, and 200 ms, second frame 12 or Data Set B is received as set 1 with coherency number (Coherency B) of 1. There are no matches for coherency numbers 2, 3 or 4 within the designated ranges, while Data Set A at time=50 ms is set 1 with a coherency number (Coherency A) of 1. Therefore, the alignment module pairs Data Set A from time=50 ms with Data Set B from time=100 ms, with Data Set B from time=150 ms, and with Data Set B from time=200 ms and allows the output of these paired these Data Sets to persist.

As indicated in Table 7, the alignment module generates a coherency error indication, i.e., indicates that a coherency fault is pending, at time=200 ms after the third consecutive failure to find a matching coherency number. In other embodiments, a coherency error indication may be indicated after one such failure, or after any determined numbers of such failures. After a coherency error indication is generated for third consecutive frame period (or other selected period), the alignment module may set a diagnostic trouble code (DTC). When the DTC is set, output data is set to invalid so that the downstream controller logic does not use any Data Sets received, as the data therein is not confirmed to have been generated at the same time by the transmitting module. The downstream controller logic in the receiving module may continue to use the last verified coherent data pair received from the transmitting module, e.g., data set 1 in Table 7, for a defined period of time until, for safety or functionality reasons, the use of such data is prohibited.

TABLE 8

Random Drop

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 0 | 3 | 4 |
| Frame 12/Data Set B | set 0 | set 1 | bad set | set 3 | set 4 |
| External CAN Fault Indication (CAN (100) Faulted) | No | No | No | No | No |
| Coherency Error Indication | No | No | Yes | No | No |
| Set DTC | No | No | No | No | No |
| Output Data set to Invalid | No | No | No | No | No |
| Output Data Set A | set 0 | set 1 | set 1 | set 3 | set 4 |
| Output Data Set B | set 0 | set 1 | set 1 | set 3 | set 4 |

Table 8 illustrates processing data with a random drop of a frame. The Data Sets received at time=0 ms, time=50 ms, time=150 ms, and time=200 ms are aligned in pairs and are processed as described above in relation to Table 1. However, at time=100 ms, first frame 11 or Data Set A is received as set 2 with a coherency number (Coherency A) of 2 while second frame 12 or Data Set B is received as a bad set of data with a coherency number of 0. The alignment module recognizes Data Set B as a bad set of data. Specifically, the alignment module recognizes the pattern established by previously received pairs of data sets and may define a certain number or certain numbers that can be expected to be received. When a number outside of the expected range of numbers is received, such as 0, the alignment module identifies the number as being reflective of a bad set of data and does not seek to find a pair for the bad set of data. Instead, the alignment module may seek a pair for coherency number 2. After no pair is found within the designated range of frames, the alignment module allows the output of the previously matched pair including set 1 to persist without update. As shown, the alignment module generates a coherency error indication, i.e., indicates that a coherency fault is pending. After receiving the matched Data Sets at time=150 ms, the alignment module removes the coherency error indication.

TABLE 9

Multiple Random Drops

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 0 | 15 | 12 |
| Frame 12/Data Set B | set 0 | set 1 | bad set | bad set | bad set |
| External CAN Fault Indication (CAN (100) Faulted) | No | No | No | No | No |
| Coherency Error Indication | No | No | Yes | Yes | Yes |
| Set DTC | No | No | No | No | Yes |
| Output Data set to Invalid | No | No | No | No | Yes |
| Output Data Set A | set 0 | set 1 | set 1 | set 1 | set 1 |
| Output Data Set B | set 0 | set 1 | set 1 | set 1 | set 1 |

Table 9 illustrates processing data with multiple random drops of frames. The Data Sets received at time=0 ms and time=50 ms are aligned in pairs and are processed as described above in relation to Table 1. However, at time=100 ms, first frame 11 or Data Set A is received as set 2 with a coherency number (Coherency A) of 2 while second frame 12 or Data Set B is received as a bad set of data with a coherency number of 0. The alignment module recognizes Data Set B as a bad set of data as described above. Therefore, the alignment module may only seek a pair for coherency number 2. After no pair is found within the designated range of frames, the alignment module allows the output of the previously matched pair including set 1 to persist without update. As shown, at time=100 ms, the alignment module generates a coherency error indication, i.e., indicates that a coherency fault is pending.

In Table 9, at time=150 ms, first frame 11 or Data Set A is received as set 3 with a coherency number (Coherency A) of 3 while second frame 12 or Data Set B is received as a bad set with a coherency number of 15. Again, 15 is outside the expected range of values and is identified by the alignment module as a bad coherency number. The alignment module may seek to find a match for Data Set A's coherency number of 3. After no match is found in the designated range of frames, the alignment module allows the output of the previously matched pair including set 1 to persist without update. As shown, the alignment module continues to generate a coherency error indication, i.e., indicate that a coherency fault is pending.

At time=200 ms, first frame 11 or Data Set A is received as set 4 with a coherency number (Coherency A) of 4 while second frame 12 or Data Set B is received as a bad set with a coherency number of 12. Again, 12 is outside the expected range of values and is identified by the alignment module as a bad coherency number. The alignment module may seek to find a match for Data Set A's coherency number of 4. After no match is found in the designated range of frames, the alignment module allows the output of the previously matched pair including set 1 to persist without update. Further, as the third set of frames fails to include a paired or pair-able data set, the alignment module sets a DTC and Output Data is set to invalid in accordance with a user-selected limit of three consecutive frame periods. As noted above, other limits for setting a DTC and setting Output Data to invalid may be defined or selected.

TABLE 10

Triple Frame Delay

| Time (ms) | 0 | 50 | 100 | 150 | 200 |
|---|---|---|---|---|---|
| Coherency A | 0 | 1 | 2 | 3 | 4 |
| Frame 11/Data Set A | set 0 | set 1 | set 2 | set 3 | set 4 |
| Coherency B | 0 | 1 | 1 | 1 | 1 |
| Frame 12/Data Set B | set 0 | set 1 | set 1 | set 1 | set 1 |
| External CAN Fault Indication (CAN (100) Faulted) | No | No | No | No | Yes |
| Coherency Error Indication | No | No | No | No | No |
| Set DTC | No | No | No | No | No |
| Output Data set to Invalid | No | No | No | No | No |
| Output Data Set A | set 0 | set 1 | set 1 | set 1 | set 1 |
| Output Data Set A | set 0 | set 1 | set 1 | set 1 | set 1 |

Table 10 illustrates treatment of a triple repeated or delayed frame similar to Table 7 above. However, Table 10 illustrates the use of the external CAN fault indication, i.e., an indication that CAN 100 of FIG. 1 is faulted.

As indicated by the embodiment of Table 10, the receiving module receives, or may expect to receive, Data Sets A and B. If new data sets are not received by the receiving module, the receiving module may communicate to the alignment module that new data is not being received. For example, the receiving module may communicate that new Frame 12/Data Set B are not being received, i.e., that Data Set B is stale data. As a result, the system generates an External CAN Fault Indication and some functionality of the processing may be halted.

Figure 2:
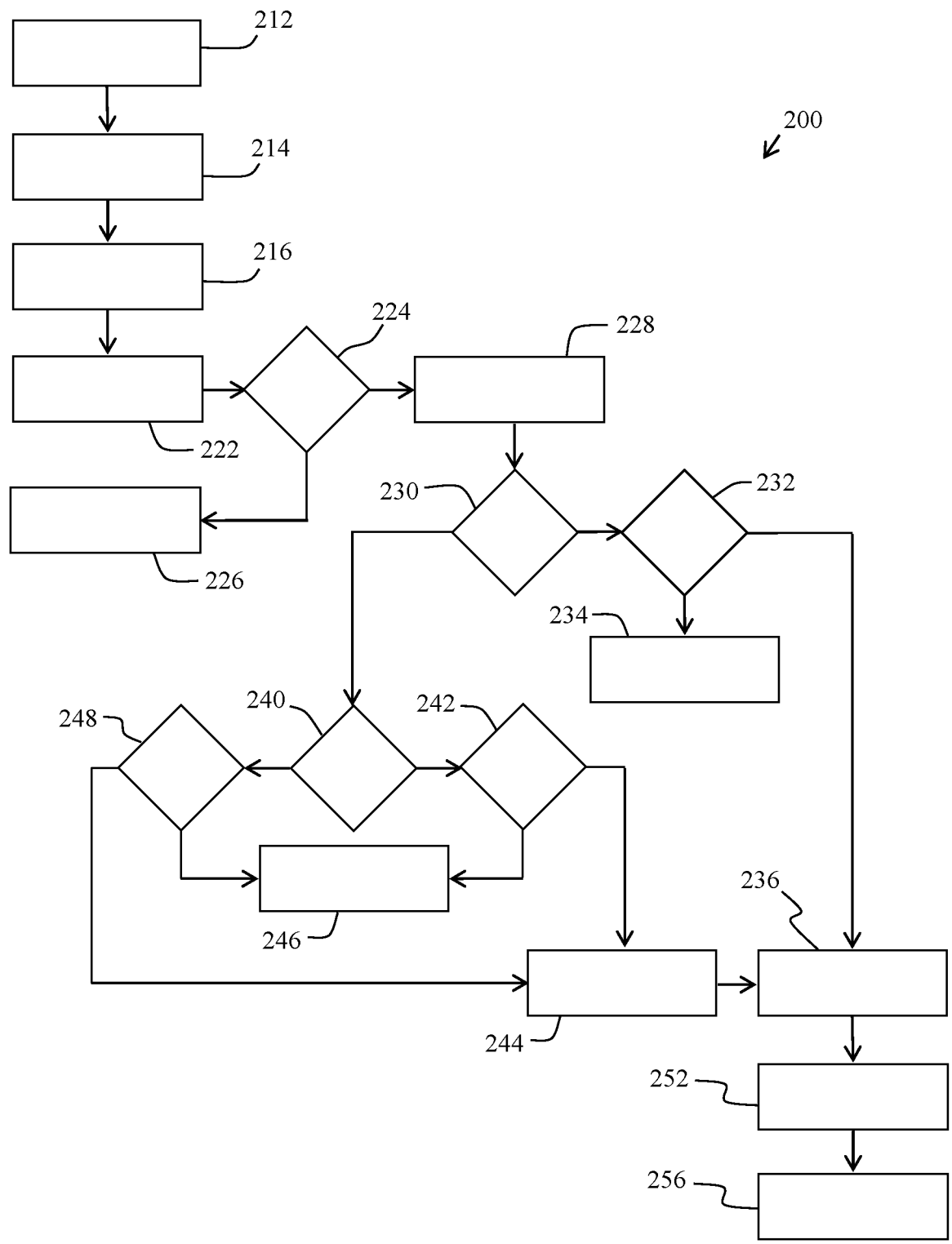
FIG. 2 is a flow chart illustrating a method for processing coherent data according to one or more embodiments.

Referring now to FIG. 2, a flow chart for an exemplary method 200 for processing coherent data is provided. At action block 212, sensor or input data is obtained as coherent data, such as by a sampling or reading by the transmitting module. For example, a vehicle sensor may monitor a property of or at a vehicle component and the transmitting module may sample or read the sensor data. At action block 214, the coherent data is split into two or more separate CAN frames, which are each assigned a coherency number. The coherency number may be selected based on a time that the coherent data was obtained or based on the time that the frame is transmitted. At action block 216, the CAN frames are transmitted from the transmitting module to a receiving module.

At action block 222, incoming CAN frames including coherency numbers are received. The method 200 then determines at query 224 whether the CAN bus is faulted. If the CAN bus is faulted, then at action block 226 the method stops processing of incoming data to the downstream logic. If the bus is not faulted, then at action block 228, the method populates the buffer with the incoming CAN frames.

The method continues at query 230 where it is determined whether the most recently received CAN frames have coherency numbers that match one another. If the coherency numbers of the two most recently received CAN frames match, then the method 200 determines at query 232 whether a coherency fault is active and a frame is exhibiting a stagnant condition. If yes, then at action block 234 the method maintains the coherency fault as active. If no, then at action block 236 the paired CAN frames are output to downstream logic.

If at query 230 it is determined that the most recently received CAN frames do not have coherency numbers that match, then the method 200 determines at query 240 whether the coherency number of Frame 1 is ahead of the coherency number of Frame 2. If the coherency number of Frame 1 is ahead of the coherency number of Frame 2, then the method continues at query 242 by determining whether the Frame 1 buffer contains a data set with a coherency number that matches the coherency number of Frame 2. Further, query 242 checks that the sequential order of the Frame 1 buffer also contains a coherency number order that reflects stale or increasing value, within a defined range, e.g., if the oldest buffer data contains a coherency number of 5, but the next newest buffer data contains a coherency number of 4, then there would not be a valid order of coherency number. If the Frame 1 buffer does contain a data set with a coherency number that matches the coherency number of Frame 2, then at action block 244 the method 200 pairs the frames with matching coherency numbers. Thereafter, the paired frames are output to downstream logic at action block 236.

If at query 242 it is determined that the Frame 1 buffer does not contain a data set with a coherency number that matches the coherency number of Frame 2, then at action block 246 the method 200 generates a coherency error indication, i.e., sets the coherency fault as pending.

If at query 240 it is determined that the coherency number of Frame 1 is not ahead of the coherency number of Frame 2, then the method continues at query 248 by determining whether the Frame 2 buffer contains a data set with a coherency number that matches the coherency number of Frame 1. Further, query 248 checks that the sequential order of the Frame 2 buffer also contains a coherency number order that reflects stale or increasing value, within a defined range, e.g., if the oldest buffer data contains a coherency number of 5, but the next newest buffer data contains a coherency number of 4, then there would not be a valid order of coherency number. If the Frame 2 buffer does contain a data set with a coherency number that matches the coherency number of Frame 1, then at action block 244 the method 200 pairs the frames with matching coherency numbers. Thereafter, the paired frames are output to downstream logic at action block 236.

If at query 248 it is determined that the Frame 2 buffer does not contain a data set with a coherency number that matches the coherency number of Frame 1, then at action block 246 the method 200 generates a coherency error indication, i.e., indicates that a coherency fault is pending.

The method 200 may continue after outputting the paired frames at action block 236 with processing the coherent data from the two separate frames in the downstream logic at action block 252. At action block 256, the method includes operating the vehicle based on the processing of the coherent data by the downstream logic.

As described herein, embodiments of methods, systems and computer readable storage medium for processing coherent data are provided. In the embodiments, coherent data is divided into two or more separate frames for transmittal. A same coherency number is applied to the pairs or sets of frames holding coherent data. After transmittal of the frames, the receiving module is able to determine whether received frames hold coherent data based on the coherency numbers applied to the frames. Embodiments herein provide for processing coherent data despite delays or errors in the transmittal and receipt of the frames.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A method for processing coherent data, the method comprising:
   obtaining a data signal comprising an amount of the coherent data, wherein the amount of the coherent data is greater than a capacity limit of a single controller area network (CAN) frame;
   splitting the coherent data into two separate CAN frames comprising a first CAN frame and a second CAN frame;
   selecting one coherency number from a bit-limited rolling counter value;
   applying the coherency number to each of the two separate CAN frames;
   transmitting a CAN signal including the two separate CAN frames to a receiving module;
   determining whether the two separate CAN frames match by confirming that the coherency number of the first CAN frame is identical to the coherency number of the second CAN frame; and
   when the two separate CAN frames match, outputting the two separate CAN frames to downstream logic.

2. The method of claim 1 wherein
   obtaining the data signal comprises reading or sampling vehicle sensor data from a vehicle sensor with a transmitting module within a vehicle, wherein the vehicle sensor data is the coherent data;
   transmitting the CAN signal including the two separate CAN frames to the receiving module comprises transmitting the two separate CAN frames from the transmitting module to a receiving module within that same vehicle;
   the receiving module determines whether the two separate CAN frames match and outputs the two separate CAN frames to the downstream logic when the two separate CAN frames match; and
   the method further comprises processing the coherent data from the two separate CAN frames for use in the downstream logic and operating the vehicle based on that downstream logic.

3. The method of claim 1 wherein applying the coherency number to each of the two separate CAN frames occurs simultaneously with transmitting the CAN signal including the two separate CAN frames to the receiving module.

4. The method of claim 3 wherein the coherency number is selected based on a time that the coherent data is obtained.

5. The method of claim 1 further comprising:
   adding the two separate CAN frames to a buffer populated with a selected number of most recently received CAN frames; and
   when the two separate CAN frames do not match, identifying a selected CAN frame from the two separate CAN frames and searching the buffer for a matching CAN frame from the most recently received CAN frames.

6. The method of claim 5 further comprising:
   identifying the matching CAN frame from the most recently received CAN frames; and
   outputting the selected CAN frame and the matching CAN frame to the downstream logic.

7. The method of claim 5 further comprising:
   confirming that the most recently received frames do not include a matching CAN frame; and
   setting a coherency error indication.

8. The method of claim 5 further comprising analyzing the most recently received CAN frames to identify an expected coherency number or range of coherency numbers.

9. The method of claim 8 wherein the coherency number of each of the two separate CAN frames is compared to the expected coherency number or range of coherency numbers.

10. A system for processing coherent data, the system comprising:
    a communications network coupled by a communication bus;
    a transmitting module configured to (i) obtain a data signal comprising an amount of the coherent data, wherein the amount of the coherent data is greater than a capacity limit of a single controller area network (CAN) frame, to (ii) transmit a CAN signal including the coherent data split between two separate CAN frames, (iii) to select one coherency number from a bit-limited rolling counter value, and to (iv) apply the coherency number to the two separate CAN frames, wherein the transmitting module comprises transmitting processing circuitry;
    a receiving module including a buffer for storing a selected number of most recently received CAN frames, wherein the receiving module comprises receiving processing circuitry; and
    an alignment module for matching CAN frames based on the coherency number of each CAN frame, wherein the alignment module comprises alignment processing circuitry.

11. The system of claim 10 further comprising a vehicle sensor configured to monitor operating conditions or performance of or at a vehicle component, wherein the vehicle sensor provides that data signal comprising the amount of coherent data.

12. The system of claim 10 wherein the transmitting module is configured to apply the coherency number to the two separate CAN frames simultaneously with transmitting the CAN signal to the receiving module.

13. The system of claim 12 wherein the transmitting module is configured to select the coherency number based on a time that the coherent data is obtained.

14. The system of claim 10 wherein the alignment module is configured to search the buffer for a matching frame from the most recently received frames.

15. The system of claim 14 wherein the alignment module is configured to set a coherency error indication when the most recently received frames do not include a matching frame.

16. The system of claim 14 wherein the alignment module is configured to analyze the most recently received frames to identify an expected coherency number or range of coherency numbers and to compare the coherency number of each of the two separate frames to the expected coherency number or range of coherency numbers.

17. A non-transitory computer readable storage medium having program instructions embodied therewith, the program instructions readable by a processor to cause the processor to perform a method for processing coherent data comprising:
- identifying that an amount of coherent data in a data signal is greater than a capacity limit of a single controller area network (CAN) frame;
- dividing the coherent data into two separate CAN frames including a first CAN frame and a second CAN frame;
- selecting one coherency number from a bit-limited rolling counter value;
- applying the coherency number to the two separate CAN frames;
- transmitting a signal including the two separate CAN frames to a receiving module;
- determining whether the two separate CAN frames match by confirming that the coherency number of the first CAN frame is identical to the coherency number of the second CAN frame; and
- when the two separate CAN frames match, outputting the two separate CAN frames to downstream logic.

* * * * *